(12) United States Patent
Eriksson et al.

(10) Patent No.: US 12,560,671 B2
(45) Date of Patent: Feb. 24, 2026

(54) SYSTEM, COMPUTER-IMPLEMENTED POSITIONING METHOD, COMPUTER PROGRAM AND NON-VOLATILE DATA CARRIER

(71) Applicant: DELAVAL HOLDING AB, Tumba (SE)

(72) Inventors: Göran Eriksson, Tumba (SE); Anders Umegård, Tumba (SE)

(73) Assignee: DeLaval Holding AB, Tumba (SE)

( * ) Notice: Subject to any disclaimer, the term of this patent is extended or adjusted under 35 U.S.C. 154(b) by 299 days.

(21) Appl. No.: 18/568,239

(22) PCT Filed: Jun. 2, 2022

(86) PCT No.: PCT/SE2022/050538
§ 371 (c)(1),
(2) Date: Dec. 7, 2023

(87) PCT Pub. No.: WO2022/260575
PCT Pub. Date: Dec. 15, 2022

(65) Prior Publication Data
US 2024/0302479 A1 Sep. 12, 2024

(30) Foreign Application Priority Data
Jun. 8, 2021 (SE) .................................... 2150724-9

(51) Int. Cl.
*G01S 5/00* (2006.01)

(52) U.S. Cl.
CPC ............ *G01S 5/0045* (2013.01); *G01S 5/019* (2020.05)

(58) Field of Classification Search
CPC .... G01S 5/0045; G01S 5/019; G01S 2205/01; G01S 5/02213; G01S 5/01; A01K 11/006
See application file for complete search history.

(56) References Cited

U.S. PATENT DOCUMENTS

2007/0279281 A1* 12/2007 Oda ...................... H04W 64/00
342/450
2015/0356332 A1 12/2015 Turner et al.
(Continued)

FOREIGN PATENT DOCUMENTS

CN 112912752 A 6/2021
EP 2709443 B1 11/2017
(Continued)

OTHER PUBLICATIONS

International Search Report for PCT/SE2022/050538 mailed Sep. 13, 2022, 2 pages.
(Continued)

*Primary Examiner* — Dhaval V Patel
(74) *Attorney, Agent, or Firm* — NIXON & VANDERHYE

(57) ABSTRACT

Each of multiple entities has a respective attached mobile unit that transmits, periodically, a first radio message with identity information of the corresponding entity. At least three base stations receive the first radio message; and based thereon, forward, via a transmission line, the identity information and timing information indicating when the first radio message was received. A central unit communicatively connected to the at least one transmission line receives, via the transmission line, the identity and timing information from the base stations, and based thereon determines a position of the respective entity. Each mobile unit alters an energy density at which the first radio message is transmitted in response to a trigger input being generated depending on a position of the mobile unit relative to a stationary reference. Thus, the energy resources in the mobile units can be economized while attaining a desired positioning accuracy wherever needed.

23 Claims, 3 Drawing Sheets

(56)          References Cited

U.S. PATENT DOCUMENTS

| | | |
|---|---|---|
| 2019/0113631 A1 | 4/2019 | Stroiescu et al. |
| 2019/0114911 A1* | 4/2019 | Rezaei .................. G08G 1/164 |
| 2020/0228943 A1 | 7/2020 | Martin et al. |
| 2021/0048500 A1* | 2/2021 | Manolakos ........... G01S 5/0054 |
| 2021/0048503 A1* | 2/2021 | Ljung .................. G01S 5/0236 |
| 2021/0080596 A1 | 3/2021 | Moeglein et al. |
| 2021/0112370 A1* | 4/2021 | Van .......................... G01S 5/06 |

FOREIGN PATENT DOCUMENTS

| | | | |
|---|---|---|---|
| EP | 3720151 | A1 | 10/2020 |
| WO | 2006022548 | A1 | 3/2006 |

OTHER PUBLICATIONS

Written Opinion of the ISA for PCT/SE2022/050538 mailed Sep. 13, 2022, 11 pages.
Swedish Search Report for SE2150724-9 mailed Feb. 7, 2022, 2 pages.

* cited by examiner

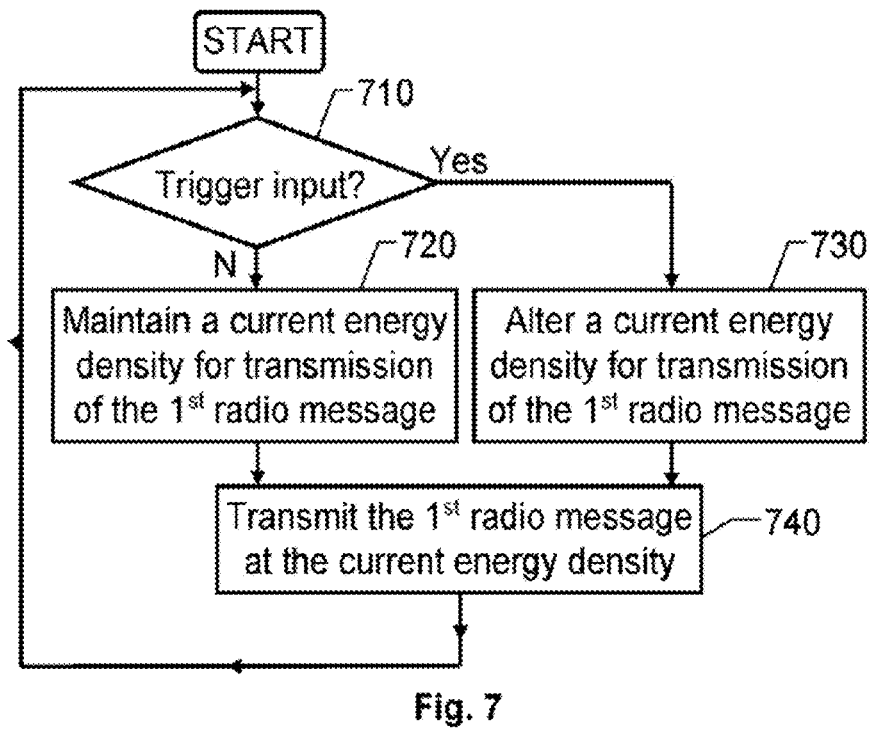
Fig. 7
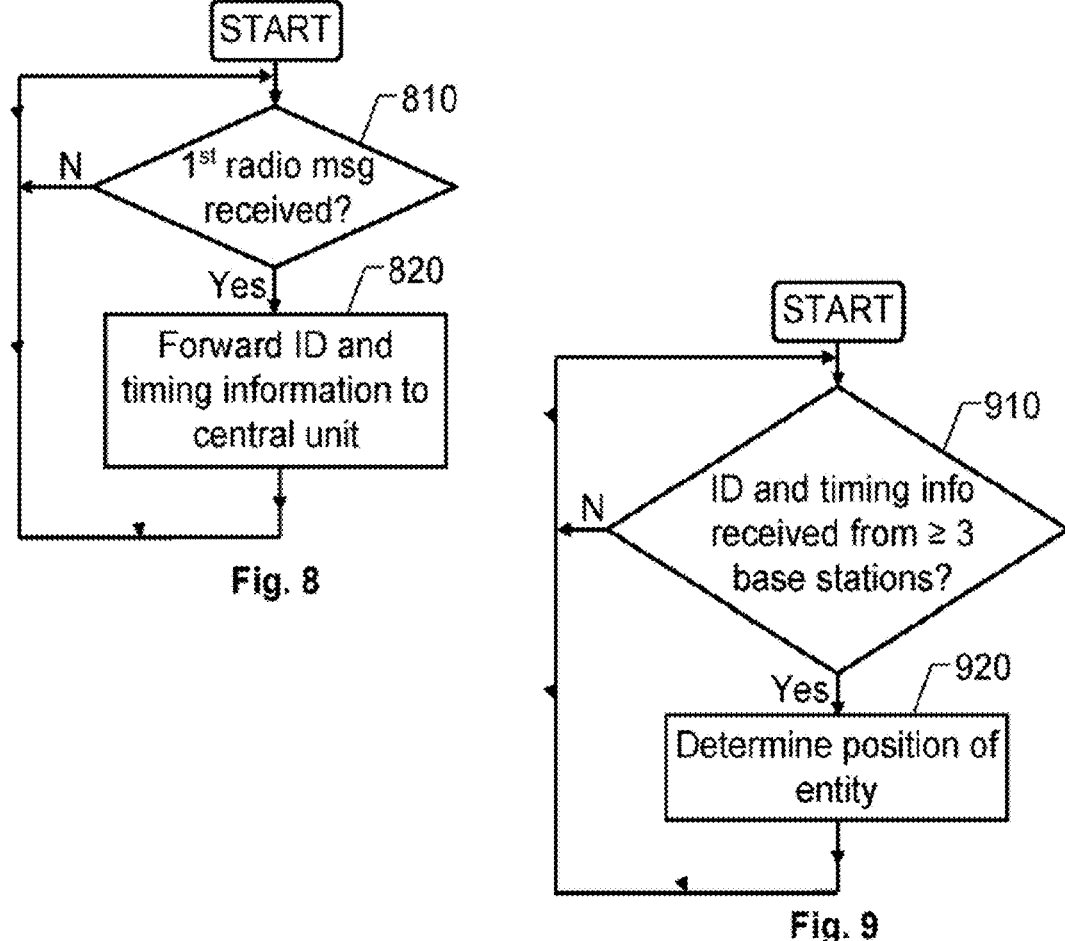
Fig. 8
Fig. 9

SYSTEM, COMPUTER-IMPLEMENTED POSITIONING METHOD, COMPUTER PROGRAM AND NON-VOLATILE DATA CARRIER

CROSS-REFERENCE TO RELATED APPLICATIONS

This application is the U.S. national phase of International Application No. PCT/SE2022/050538 filed Jun. 2, 2022 which designated the U.S. and claims priority to SE 2150724-9 filed Jun. 8, 2021, the entire contents of each of which are hereby incorporated by reference.

TECHNICAL FIELD

The present invention relates generally to positioning of mobile entities. Especially, the invention relates to a system according to the preamble of claim 1 and a corresponding computer-implemented method. The invention also relates to a computer program and a non-volatile data carrier storing such a computer program.

BACKGROUND

In positioning systems, a high accuracy is generally desired. However, the mobile units, or tags, that are attached to the entities whose positions are to be determined are typically rather small-sized. Therefore, each tag's energy resources are modest, and must be economized to optimize battery life. It is consequently difficult to find a suitable tradeoff between accuracy and battery life.

EP 2 709 443 describes a system for observing animals, including at least one mobile identification unit configured to be worn by an animal. The identification unit includes a memory, an on/off-switchable first-type transmitter unit for transmitting a radio wave for transmitting data, a first-type receiver unit, and a control circuit connected with the memory, the first-type receiver unit and the first-type transmitter unit. The first-type receiver unit includes a resonant circuit which responds when it is introduced into an electromagnetic interrogation field, wherein the identification unit is configured such that the first-type transmitter unit can be activated for transmitting data when the first-type receiver unit responds when it is introduced into the interrogation field. The system further includes at least one second-type receiver unit for receiving the radio wave which is transmitted with the first-type transmitter unit. The system further includes at least one reader unit for generating the interrogation field and for detecting a response of the first-type receiver unit when it is located in the interrogation field. The reader unit is configured to modulate the interrogation field with a transmission code, wherein the identification unit is configured for, in response to the reception of the transmission code with the aid of the first-type receiver unit, transmitting the radio wave with the first-type transmitter unit with a response code related to the received transmission code, for receiving of the response code with the second-type receiver unit. Information about detected movements may also be used to active a transmitter unit WO 2006/022548 shows a system for locating at least one animal in a predetermined area, which animal is provided with at least one label provided with a transmitter for transmitting an ultra-wide band signal. At least one receiver which is placed in or adjacent the area is designed to receive the ultra-wide band signal of the transmitter of the at least one label, and a signal processing device is connected to or integrated with the at least one receiver for locating the at least one label on the basis of the ultra-wide band signal received by the at least one receiver on the basis of, for instance, delay time and/or reception angle.

Thus, positioning systems are known in which a reporting behavior of the units to be positioned depend on various conditions for these units. However, there is yet no solution that combines a high positioning accuracy with a low overall energy consumption.

SUMMARY

The object of the present invention is therefore to offer a solution that solves the above problem by economizing the energy resources while offering high positioning accuracy whenever needed.

According to one aspect of the invention, the object is achieved by a system including a set of mobile units, a set of base stations and a central unit. Each mobile unit in the set of mobile units is configured to be attached to a respective entity, and transmit, periodically, a first radio message containing identity information of the respective entity to which the mobile unit is attached. The set of base stations includes at least three base stations, each of which is configured to receive the first radio message; and based thereon, forward, via at least one transmission line, the identity information and timing information indicative of a point in time when the first radio message was received in the respective base station. The central unit is communicatively connected to the at least one transmission line. The central unit is configured to receive, via the at least one transmission line, the identity information and the timing information from at least three base stations in the set of base stations. Based thereon, the central unit is configured to determine a position of the respective entity. Moreover, each mobile unit in the set of mobile units is configured to alter an energy density at which the first radio message is transmitted in response to a trigger input being generated depending on a location of the mobile unit relative to a stationary reference. Here, the energy density may represent a repetition frequency at which a mobile unit in the set of mobile units transmits the first radio message, and/or a power level at which a mobile unit in the set of mobile units transmits the first radio message.

This system is advantageous because the mobile units are controllable with respect to their respective location, so that they never emit more radio energy than what is required at this location. The term "location" is here understood to designate a region of space relative to the stationary reference. The requirements, in turn, typically vary between different positioning implementations. The requirements may also vary over time for a particular implementation. This renders the system highly flexible and customer friendly.

According to one embodiment of this aspect of the invention, each mobile unit in the set of mobile units contains a global navigation satellite system receiver (GNSS) configured to determine a location of the mobile unit. Each mobile unit in the set of mobile units is further configured to generate the trigger input based on a set of rules defining the stationary reference, for example as one or more areas in an environment for the entities. The set of rules is stored in a data carrier in each respective mobile unit. Thereby, the mobile units may alter the energy density at which they transmit the first radio message in a fully autonomous manner. This, in turn, leads to a robust system design.

According to another embodiment of this aspect of the invention, the system includes at least one magnetic-field generator that is configured to emit a magnetic field at the stationary reference. Each mobile unit in the set of mobile units further has an inductive sensor configured to detect the magnetic field as the trigger input. In response to such a detection, the mobile unit is caused to alter the energy density at which the first radio message is transmitted. For example, in practice, this may mean that when an animal carrying the mobile unit approaches a gate, a magnetic-field generator located at a distance in front of the gate triggers the mobile unit to transmit the first radio message at a higher repetition frequency being substantially higher than prior to reaching the magnetic-field generator. Not only does this increase the rate at which the animal's position can be updated. Additional advantageous effects are also enabled.

Specifically, according to one embodiment of this aspect of the invention, the stationary reference defines an area in front of an automatically controlled gate. Here, each mobile unit in the set of mobile units that is determined to have a location in the area in front of the gate is controlled to transmit the first radio message at a higher repetition frequency than mobile units in the set of mobile units determined to be located outside this area. The central unit is configured to calculate a respective velocity of each mobile unit in the area in front of the gate. The velocity calculations can be made relatively accurate due to the high repetition frequency of the first radio message. This, in turn, facilitates controlling the gate in a desired manner even if the animals come running towards the gate.

According to yet another embodiment of this aspect of the invention, each mobile unit in the set of mobile units is further configured to receive a second radio message as the trigger input; and in response to receiving the second radio message cause the mobile unit to alter the energy density at which the first radio message is transmitted. Consequently, the mobile units do not need to include any mechanisms for determining whether they are located where the transmission principle for transmitting the first radio message shall be altered. Of course, this lowers the weight and/or the manufacturing cost for the mobile units.

According to still another embodiment of this aspect of the invention, at least one base station in the set of base stations is configured to receive a first-area message from the central unit, which first-area message is generated in response to a particular mobile unit in the set of mobile units having the location determined to be within the area defined by the stationary reference. In response to the first-area message, the at least one base station is configured to transmit the second radio message to the particular mobile unit. Thus, the base stations may be employed to control the mobile units' behaviors when transmitting the first radio message via the second radio message on the downlink. This is advantageous be cause a minimal level of circuitry is required in the mobile units and it is not necessary to arrange any external triggering means in the area where the mobile units move around.

According to another embodiment of this aspect of the invention, each mobile unit in the set of mobile units is configured to transmit the first radio message at a first, a second or a third level of energy density. The first level of energy density is a default level, and the second and third energy density levels are different from one another as well as from the first level. Here, in response to receiving the second radio message, the particular mobile unit is configured to transmit the first radio message at the second level of energy density. At least one base station in the set of base stations is further configured to receive a second-area message from the central unit, which second-area message is generated in response to a particular mobile unit in the set of mobile units having the location determined to be within an area defined by the stationary reference. In response to the second-area message, at least one base station is configured to transmit a third radio message to the particular mobile unit. Additionally, each of the mobile units in the set of mobile units is configured to receive the third radio message; and in response thereto, cause the mobile unit to transmit the first radio message at the third level of energy density. Consequently, the mobile units may be controlled to transmit the first radio message at three different levels of energy density in a very straightforward manner.

For example, the first level of energy density may be lower than the second level of energy density, which, in turn, may be lower than the third level of energy density.

According to yet another embodiment of this aspect of the invention, in response to receiving each of the second or third radio messages each mobile unit in the set of mobile units is configured to either increase or decrease the energy density at which it transmits the first radio message. Specifically, the mobile unit may increase the energy density at which the first radio message is transmitted from the first level to the second level, from the first level to the third level, or from the second level to the third level. Alternatively, the mobile unit may decrease the energy density at which the first radio message is transmitted from the third level to the first level, from the third level to the second level, or from the second level to the first level. This provides a high flexibility with respect to how the mobile units' reporting behavior can be controlled.

According to a further embodiment of this aspect of the invention, each mobile unit in the set of mobile units is configured to transmit the first radio message at the first level of energy density, e.g. the default level, a predetermined time period after having initiated transmission of the first radio message at the second or third level of energy density. Thereby, no dedicated reset or updated adjustment message is required after having controlled the mobile unit to an alternative level of energy density.

According to another embodiment of this aspect of the invention, the energy density represents: a repetition frequency at which a mobile unit in the set of mobile units transmits the first radio message, a power level at which a mobile unit in the set of mobile units transmits the first radio message, or a combination thereof. This provides useful flexibility in adapting the reporting behavior of the mobile units to the requirements of how the positioning system is implemented. For example, in some areas an increased frequency is desirable due to expected speedy motions and/or because high positioning accuracy is needed, while in other areas an elevated transmission power is desirable due to expected interferences and/or long distances to the base stations.

Preferably, the mobile units in the set of mobile units are configured to transmit the first radio message on the ultra-wide band (UWB). Namely, this frequency band allows for the transmission of a large amount of signal energy without interfering with conventional narrowband and carrier wave transmission in the same frequency band. The UWB offers data communication capability while using extremely little energy while enabling accurate location.

According to embodiments of this aspect of the invention, at least one mobile unit in the set of mobile units is configured to be attached to a livestock animal or an autonomous vehicle, for example a warehouse truck. Of course, the proposed mobile units may equally well be attached to any other entity, i.e. object, animal or person whose position is to be determined automatically.

According to one embodiment of this aspect of the invention, the first radio message also contains activity data reflecting at least one activity parameter of the respective entity to which the mobile unit is attached. The first radio message exclusively contains the activity data if the first radio message is transmitted at the first level of energy density. The central unit is here configured to receive, via at least one of the at least one transmission line, the activity data from at least one base station in the set of base stations. Based thereon, the central unit is configured to derive the at least one activity parameter of the respective entity to which the mobile unit is attached. This is especially advantageous in positioning systems for animals, e.g. dairy animals.

According to another aspect of the invention, the object is achieved by a computer-implemented positioning method, which is performed in at least one processor. The method involves transmitting, periodically, a first radio message from each mobile unit in a set of mobile units which is attached to a respective entity, the first radio message containing identity information of the respective entity to which the mobile unit is attached. The method also involves receiving the first radio message in at least three base stations; based thereon, forwarding, via at least one transmission line, the identity information and timing information indicative of a point in time when the first radio message was received in the respective base station. The identity information and the timing information from the at least three base stations are received in a central unit being communicatively connected to the at least one transmission line. Based thereon, the central unit determines a position of the respective entity. Additionally, the method involves altering, in each mobile unit in the set of mobile units, an energy density at which the first radio message is transmitted in response to a trigger input being generated depending on a location of the mobile unit relative to a stationary reference. The advantages of this method, as well as the preferred embodiments thereof, are apparent from the discussion above with reference to the proposed system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIG. 7 illustrates, by means of a flow diagram, the method performed in the mobile unit according to one embodiment of the invention;

FIG. 8 illustrates, by means of a flow diagram, the method performed in the base station according to one embodiment of the invention; and FIG. 9 illustrates, by means of a flow diagram, the method performed in the central unit according to one embodiment of the invention.

DETAILED DESCRIPTION

Figure 1:
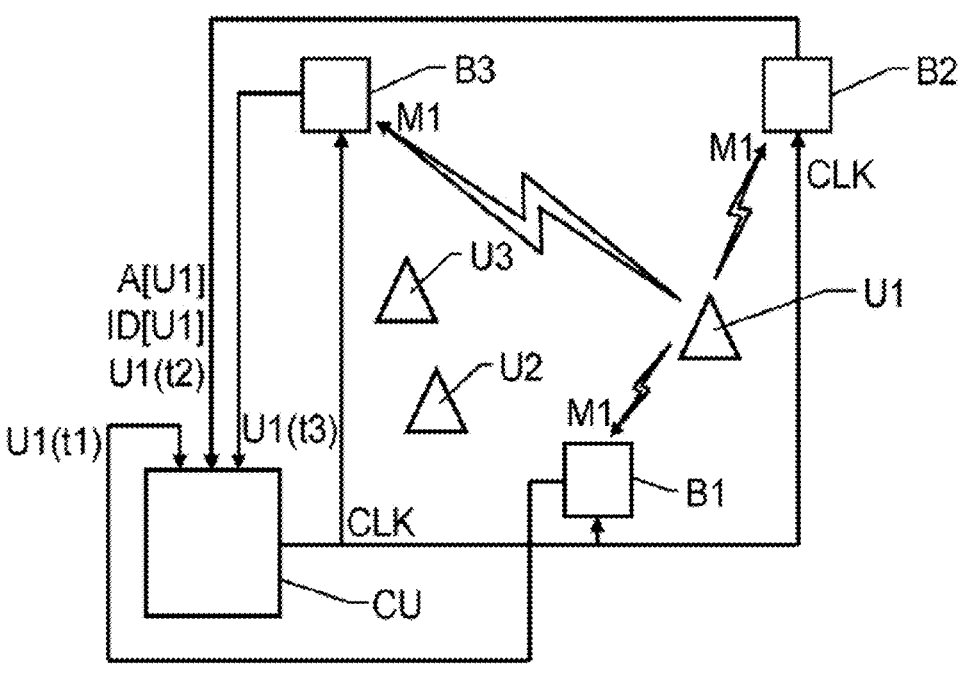
FIG. 1 shows a schematic system overview according to one embodiment of the invention.

FIG. 1 shows a schematic system overview according to one embodiment of the invention. The system contains a set of mobile units, here exemplified by U1, U2 and U3 respectively; a set of base stations, here exemplified by B1, B2 and B3 respectively and a central unit CU communicatively connected to each of the base stations B1, B2 and B3 via at least one transmission line. To maintain a common time basis, the central unit CU preferably distributes a clock signal CLK via the at least one transmission line to all the base stations B1, B2 and B3 in the system.

Each of the mobile units U1, U2 and U3 is configured to be attached to a respective entity, such as a piece of sporting equipment (e.g. a skate, an ice hockey stick, a puck or a ball), a vehicle (e.g. a car, an autonomous truck or a bike), an animal (e.g. a pet, a beef cattle or a dairy animal) or a person (e.g. a prisoner, an athlete or a child) the position of which is to be determined and tracked. To this aim, each of the mobile units U1, U2 and U3 is configured to transmit, periodically, a first radio message M1 intended to be received by the base stations B1, B2 and B3. The first radio message M1 contains identity information ID[U1] of the respective entity to which the mobile unit U1 is attached. Technically, of course, the identity information ID[U1] specifies a unique identity of the mobile unit U1 from which the first radio message M1 is transmitted. However, based on an identity conversion table it is trivial to derive a unique entity identity from the mobile unit identity information ID[U1].

As will be described below, the first radio message M1 may also contain other kinds of information relating to its carrier entity.

In order to enable positioning of the mobile units U1, U2 and/or U3, the set of base stations must include at least three base stations B1, B2 and B3 being arranged to cover a monitoring area over which the entities are expected to move. In practice, the number of base stations and the positions of the base stations are such that each part of the monitoring area is covered by the receiving antenna lobes of at least three different base stations.

Preferably, the mobile units U1, U2 and U3 and the three base stations B1, B2 and B3 are configured to communicate first radio message M1 on the UWB. Namely, this frequency band allows for the transmission of a relatively large amount of signal energy without interfering with conventional narrowband and carrier wave transmission in the same frequency band. Further, the UWB offers data communication capability while using extremely little energy while enabling accurate location.

Each of the base stations B1, B2 and B3 is configured to receive the first radio message M1, and based thereon forward the identity information ID[U1] to the central unit CU via the at least one transmission line. Further, each base stations B1, B2 and B3 sends timing information U1($t1$), U1($t2$) and U1($t3$) respectively to the central unit CU, which timing information U1($t1$), U1 ($t2$) and U1 ($t3$) indicates of a point in time when the first radio message (M1) was received in the respective base station B1, B2 and B3.

The central unit CU is configured to receive, via the at least one transmission line, the identity information ID[U1] and the timing information U1($t1$), U1($t2$) and U1($t3$) from the base stations B1, B2 and B3 respectively. Based thereon and the common time basis, the central unit CU is configured to determine a position of the entity whose mobile unit U1 transmitted the first radio message M1. Here, the term "position" is understood to designate a point in a plane, or a volume. In other words, the "position" may express a geographical coordinate of very high accuracy, for example in the order of ±10 centimeter, which is attainable by the UWB.

Although, the mobile units U1, U2 and U3 transmit the first radio message M1 periodically, an energy density at which the first radio messages M1 are transmitted may be altered, for example in terms a temporal distance between each transmitted message M1, an output power level at which the first radio message M1 is transmitted, or a combination thereof. The, energy density is altered in response to a trigger input being generated depending on a location of the mobile unit U1 relative to a stationary reference designating a predefined two- or three-dimensional region. Consequently, whenever a mobile unit U1 is located in such a predefined region, it may be controlled the trigger input to alter energy density at which the mobile unit U1 transmits its first radio messages M1.

This is advantageous because it allows the mobile units U1, U2 and U3 to conserve energy by transmitting at relatively low energy when this can be accepted for accuracy and/or updating reasons; and during periods when a high position accuracy and/or updating frequency is needed, the mobile units U1, U2 and U3 may apply substantively increased energy density to transmit the first radio messages M1.

Figures 3A, 3B, 3C, 4, 5, 6:
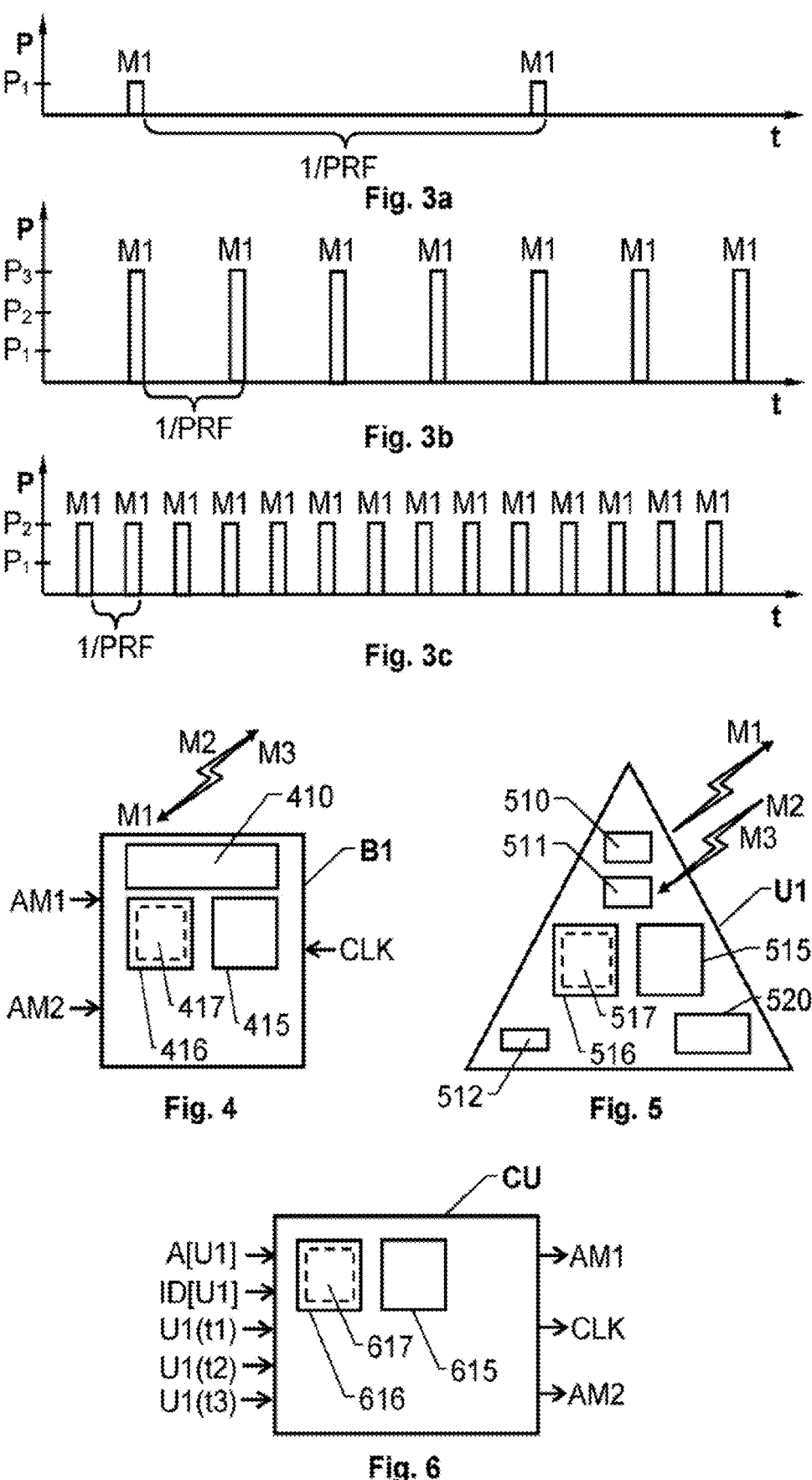
FIGS. 3a-c exemplify first messages transmitted at different energy densities according to embodiments of the invention.
FIG. 4 shows a block diagram of a base station according to one embodiment of the invention.
FIG. 5 shows a block diagram of a mobile unit according to one embodiment of the invention.
FIG. 6 shows a block diagram of a central unit according to one embodiment of the invention.

Referring now to FIG. 5, according to one embodiment of the invention, each mobile unit U1 contains a GNSS receiver 520, for example arranged to receive satellite signals from one or more of the United States' Global Positioning System (GPS), Russia's Global Navigation Satellite System (GLONASS), China's Bei Dou Navigation Satellite System (BDS), the European Union's Galileo system, Japan's Quasi-Zenith Satellite System (QZSS) and the Indian Regional Navigation Satellite System (IRNSS), which is configured to determine the location of the mobile unit U1. Moreover, each mobile unit U1 is configured to generate the trigger input based on a set of rules defining the stationary reference, i.e. the at least one predefined area where the mobile unit U1 shall alter energy density at which it transmits the first radio messages M1 in response to the trigger input. The set of rules is stored in a data carrier 516 in the mobile unit U1. Hence, no external input is required to modify the mobile unit's U1 transmission behavior.

Figure 2:
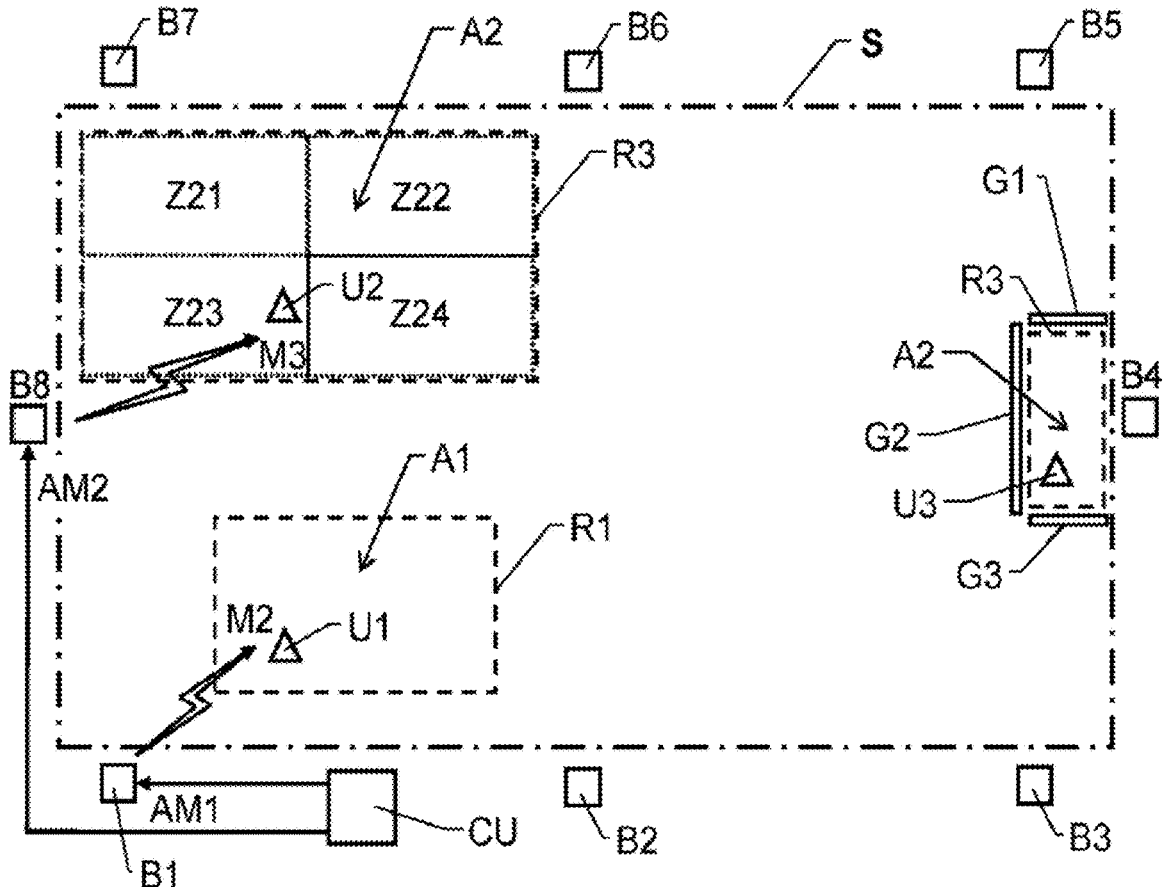
FIG. 2 shows a block diagram of a positioning system according to one embodiment of the invention.

FIG. 2 illustrates a positioning system according to embodiments of the invention with eight base stations in the form of B1, B2, B3, B4, B5, B6, B7 and B8 respectively, which surround a space S where a number of entities to be tracked are expected to move. A mobile unit U1, U2 and U3 respectively is attached to each of these entities.

For example, according to one embodiment of the invention, a mobile unit U1 is located in an area A1 of the space S, which area A1 constitutes a stationary reference R1. We assume that the mobile unit U1 has enabled the central unit CU to determine its position by transmitting one or more first radio messages M1. In response thereto, the central unit CU is configured to send a first-area message AM1 to a base station that is estimated to be able to reach the mobile unit U1 with a second radio message M2. Thus, preferably, the first-area message AM1 is sent via at least one of the transmission lines to at least one base station being located closest to the first area A1, here exemplified by a first base station B1.

In response to the first-area message AM1, the first base station B1 is configured to transmit a second radio message M2 addressed to the mobile unit U1. The mobile unit U1 is configured to receive the second radio message M2. The mobile unit U1 is configured to react to the second radio message M2 as the trigger input; and in response to receiving the second radio message therefore cause the mobile unit U1 to alter the energy density at which the first radio message M1 is transmitted.

According to one embodiment of the invention, each of the mobile units U1, U2 and U3 is configured to transmit the first radio message M1 three different levels of energy density, namely at a first, a second or a third level of energy density. Here, the first level of energy density is a default level, and the second and third energy density levels are different from one another as well as from the first level. For example, the first level of energy density may be lower than the second level of energy density, which, in turn, may be lower than the third level of energy density.

In response to receiving the second radio message M2, the mobile unit U1 is configured to transmit the first radio message M1 at the second level of energy density, for example represented by an increased repetition frequency or an elevated output power in relation to the first level of energy density.

Additionally, at least one base station, here an eighth base station B8, is further configured to receive a second-area message AM2 from the central unit CU. The second-area message AM2, in turn, is generated by the central unit CU in response to a mobile unit U2 having a location determined to be within an area A2 of the space S, which area A2 constitutes a stationary reference R2. As illustrated in FIG. 2, the area A2 may be subdivided into zones Z21, Z22, Z23 and Z24 respectively, which may or may not, be associated with different stationary references. In response to the second-area message AM2, the eighth base station B8 is configured to transmit a third radio message M3 to the mobile unit U2.

Each mobile unit, for example the mobile unit U2 is configured to receive the third radio message M3; and in response to receiving the third radio message M3 cause the mobile unit U2 to transmit the first radio message M1 at the third level of energy density, for instance represented by an increased repetition frequency or an elevated output power in relation to the second level of energy density.

According to one embodiment of the invention, the stationary reference R3 defines an area A3 in front of an automatically controlled gate, which may be arranged to control the movements of animals. Since the animals sometimes run relatively fast, especially when in a stressful situation, it is important that the mobile units U1, U2 and U3 can be tracked accurately with respect to both position and velocity in the stationary reference R3. Therefore, each mobile U3 determined to have location in this area A3 is controlled to transmit the first radio message M1 at a higher repetition frequency than a mobile unit U1 and U2 determined to be located outside this area A3. For instance, in the stationary reference R3 the mobile units U3 may transmit the first radio message M1 at a repetition frequency of 20 Hz, whereas the mobile unit U1 and U2 outside the stationary reference R3 may transmit the first radio message M1 at a repetition frequency of 0.2 Hz. The central unit CU is configured to calculate a respective velocity of each mobile unit U3 determined to have a location in the stationary reference R3 based on the first radio message M1 being transmitted at the higher repetition frequency According to one embodiment of the invention, provided that the first radio message M1 is transmitted at the first level of energy density, in addition to the identity information ID[U1], the first radio message M1 also contains activity data A[U1] reflecting at least one activity parameter of the respective entity to which the mobile unit U1 is attached. This means that the activity data A[U1] may describe one or more velocity/acceleration vectors registered by sensors, such as accelerometers, collocated with, or communicatively connected to, the respective mobile units U1, U2 and U3. Here, the central unit CU is configured to receive the activity data A[U1], via at least one of the transmission lines, from at least one base station B2, and based thereon, derive the at least one activity parameter of the entity to which the mobile units U1, U2 and U3 respectively is attached.

Although not being technically excluded, however to safe battery life, it is typically preferable not to combine transmission of the activity data A[U1] with the higher levels of energy density of the first radio message M1.

Referring now also to FIG. 5, according to one embodiment of the invention, at least one of the stationary references R3 is embodied by magnetic-field generators G1, G2 and G3 respectively arranged in the space S. The magnetic-field generators G1, G2 and G3 are configured to emit a magnetic field at the stationary reference R3. Each of the mobile units, for example a mobile unit U3 contains an inductive sensor 512 that is configured to detect the magnetic field as the trigger input. In response to such a detection, the mobile unit U3 is configured to cause the energy density to be altered at which the mobile third unit U3 transmits the first radio message M1 as described above.

According to one embodiment of the invention, in response to receiving each of the second or third radio messages M2 or M3, each mobile unit U1, U2 and U3 units is configured to either increase or decrease the energy density at which the first radio message M1 is transmitted. Specifically, the mobile unit may be configured to increase the energy density at which the first radio message M1 is transmitted from the first level to the second level, from the first level to the third level, or from the second level to the third level. Analogously, the mobile unit may be specifically configured to decrease the energy density at which the first radio message M1 is transmitted from the third level to the first level, from the third level to the second level, or from the second level to the first level.

To limit the amount of messages communicated between the base stations and the mobile units, according to one embodiment of the invention, each mobile unit U1, U2 and U3 is configured to transmit the first radio message M1 at the first level of energy density a predetermined time period after having initiated transmission of the first radio message M1 at the second or third level of energy density. In other words, the mobile unit U1, U2 and U3 exclusively use the second or third level of energy density during the predetermined time period.

FIG. 3a shows a first example, where the first messages M1 are transmitted at a first energy density, for example representing a default level associated with a lowest degree of energy consumption in the mobile unit. Here, a repetition frequency PRF may be in the order of 0.1 Hz to 0.5 Hz, and an output power $P_1$ may be in the order of 1 nJ/b (nano Joule per bit).

FIG. 3b shows a second example, where the first messages M1 are transmitted at a second energy density, for example representing a level between the default level and a highest level. Here, the repetition frequency PRF may be in the order of 0.5 Hz to 2 Hz, and the output power $P_3$ may be in the order of 1 nJ/b to 5 1 nJ/b.

FIG. 3c shows a third example, where the first messages M1 are transmitted at a third energy density for example representing a the highest level. Here, the repetition frequency PRF may be in the order of 2 Hz to 20 Hz. Depending on the implementation, the output power $P_2$ may not need to be particularly high. In many implementations, frequent position updates are more important because this enables determining the velocity of the entities very accurately. Thus, the output power $P_2$ may for example range from 1 nJ/b to 5 1 nJ/b.

FIG. 4 shows a block diagram of the base station B1 according to one embodiment of the invention. It is generally advantageous if the base station B1 is configured to effect the above-described procedure in an automatic manner by executing a computer program 417. Therefore, the base station B1 may include a memory unit 416, i.e. non-volatile data carrier, storing the computer program 417, which, in turn, contains software for making processing circuitry in the form of at least one processor 415 in the base station B1 execute the actions mentioned in this disclosure when the computer program 417 is run on the at least one processor 415.

FIG. 5 shows a block diagram of a mobile unit U1 according to one embodiment of the invention. It is generally advantageous if the mobile unit U1 is configured to effect the above-described procedure in an automatic manner by executing a computer program 517. Therefore, the mobile unit U1 may include a memory unit 516, i.e. non-volatile data carrier, storing the computer program 517, which, in turn, contains software for making processing circuitry in the form of at least one processor 515 in the mobile unit U1 execute the actions mentioned in this disclosure when the computer program 517 is run on the at least one processor 515.

FIG. 6 shows a block diagram of the central unit CU according to one embodiment of the invention. It is generally advantageous if the central unit CU is configured to effect the above-described procedure in an automatic manner by executing a computer program 617. Therefore, the central unit CU may include a memory unit 616, i.e. non-volatile data carrier, storing the computer program 617, which, in turn, contains software for making processing circuitry in the form of at least one processor 615 in the central unit CU execute the actions mentioned in this disclosure when the computer program 617 is run on the at least one processor 615.

In order to sum up, and with reference to the flow diagrams in FIGS. 7 to 9, we will now describe the computer-implemented positioning method according to the invention. Here, FIG. 7 specifically illustrates the method performed in the mobile unit, FIG. 8 specifically illustrates the method performed in the base station and FIG. 9 specifically illustrates the method performed in the central unit.

In a first step 710 of FIG. 7, the mobile unit checks if a trigger input has been received, for example based on a location determined via a GNSS receiver of the mobile unit and a set of rules defining a stationary reference, based on a detected magnetic field or based on a received radio message. If a trigger input has been received, the procedure continues to a step 730. Otherwise, a step 720 follows in which a current energy density for transmission of the first radio message is maintained. In step 730 the energy density for transmission of the first radio message is altered, i.e. increased or decreased, as specified by the trigger input. After step 720 or 730, a step 740 follows in which the mobile unit transmits the first radio message at its current energy density. Thereafter, the procedure loops back to step 710.

In a first step 810 of FIG. 8, the base station checks it if has received the first radio message from a mobile unit; and if so, a step 820 follows. Otherwise, the procedure loops back and stays in step 810. In step 820, the base station forwards the identity information of the mobile unit received in the first radio message to the central unit. The base station forwards also forwards timing information to the central unit, which timing information indicates a point in time when the base station received the first radio message. Thereafter, the procedure loops back to step 810.

In a first step 910 of FIG. 9, the central unit checks if it has received identity information and timing information relating to a particular mobile unit from at least three base stations. If so, a step 920 follows; and otherwise, the procedure loops back and stays in step 910. In step 920, the central unit determines a position of the entity carrying the mobile unit from which the first radio message was received. Thereafter, the procedure loops back to step 910.

The process steps described with reference to FIGS. 7, 8 and 9 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. A system comprising:
a set of mobile units (U1, U2, U3) each of the mobile units being configured to:
  be attached to a respective entity, and
  transmit, periodically, a first radio message (M1) including identity information (ID[U1]) of the respective entity to which the mobile unit (U1) is attached;
at least three base stations (B1, B2, B3, B4, B5, B6, B7, B8), each of the base stations being configured to:
  receive the first radio message (M1); and
  based on the received first radio message, forward, via at least one transmission line communicatively connected to said base station, the identity information (ID[U1]) and timing information (U1(*t*1), U1(*t*2); U1(*t*3)) indicative of a point in time when the first radio message (M1) was received in the respective base station; and
a central unit (CU) communicatively connected to the at least one transmission line, and configured to:
  receive, via the at least one transmission line, the identity information (ID[U1]) and the timing information (U1(*t*1), U1(*t*2), U1(*t*3)) from at least three of the base stations (B1, B2, B3); and
  based on the received identity information and the received timing information, determine a position of the respective entity relative to the at least three base stations,
wherein each given one of the mobile units (U1, U2, U3) is configured to alter an energy density (PRF, P) at which subsequent said first radio messages (M1) is are transmitted by the given mobile unit in response to a trigger input being generated depending on a location of the mobile unit (U1) relative to a stationary reference (R1, R2, R3),
  wherein each of the mobile units is further configured to receive a second radio message (M2) as the trigger input of a given said mobile unit when the location of the given mobile unit (U1) is within an area (A1) defined by the stationary reference (R1); and in response to receiving the second radio message cause the given mobile unit (U1) to alter the energy density (PRF, P) at which subsequent said first radio messages are transmitted, and wherein at least one of the base stations is configured to:

receive a first-area message (AM1) from the central unit (CU), which first-area message (AM1) is generated in response to a first said mobile unit (U1) having the location determined to be within a first said area (A1) defined by a first said stationary reference (R1); and in response thereto transmit the second radio message (M2) to the first mobile unit (U1).

2. The system according to claim 1, wherein each said mobile unit (U1) in the set of mobile units (U1, U2, U3) comprises a global navigation satellite system receiver (520) configured to determine the location of the mobile unit (U1), and each said mobile unit (U1) in the set of mobile units (U1, U2, U3) is configured to generate the trigger input based on a set of rules defining the stationary reference (R1), which set of rules is stored in a data carrier (516) in each respective said mobile unit (U1).

3. The system according to claim 1, further comprising at least one magnetic-field generator (G1, G2, G3), each said magnetic-field generator being configured to emit a magnetic field at the stationary reference (R2), and each given said mobile unit further comprises an inductive sensor (512) configured to detect the magnetic field as the trigger input for the given mobile unit when the location of the given mobile unit (U2) is within an area (A2) defined by the stationary reference (R2), and in response to the detection cause the given mobile unit (U2) to alter the energy density (PRF, P) at which subsequent said first radio messages are transmitted.

4. The system according to claim 1, wherein each of the mobile units is configured to transmit each said first radio message (M1) at a first, a second or a third said level of energy density (PRF,P), the first level of energy density being a default level, the second and the third energy density levels being different from one another as well as from the first level, wherein, in response to receiving the second radio message (M2), the given mobile unit (U1) is configured to transmit subsequent said first radio messages at the second level of energy density (PRF, P);

wherein at least one of the base stations is further configured to:

receive a second-area message (AM2) generated by the central unit (CU) in response to a second said mobile unit (U3) having a location determined to be within a second said area (A3) defined by a second said stationary reference (R3), and in response to the second-area message (AM2)

transmit a third radio message (M3) to the second mobile unit (U3), wherein each of the mobile units is further configured to receive the third radio message (M3); and in response to receiving the third radio message (M3) cause the second mobile unit (U3) to transmit subsequent said first radio messages at the third level of energy density (PRF, P).

5. The system according to claim 4, wherein the first level of energy density is lower than the second level of energy density, which, in turn, is lower than the third level of energy density.

6. The system according to claim 4, wherein:

the first radio message (M1) further comprises activity data (A[U1]) reflecting at least one activity parameter of the respective entity to which the mobile unit (U1)

is attached, which activity data (A[U1]) is comprised in the first radio message (M1) exclusively if the first radio message (M1) is transmitted at the first level of energy density (PRF, P), and the central unit (CU) is configured to receive, via at least one of the at least one transmission line, from at least of the base stations, the activity data (A[U1]); and based thereon, derive the at least one activity parameter of the respective entity.

7. The system according to claim 4, wherein in response to receiving each of the second or third radio messages (M2; M3), each of the mobile (U1, U2, U3) units is configured to either:

increase the energy density at which subsequent said first radio messages are transmitted from the first level to the second level, from the first level to the third level, or from the second level to the third level; or decrease the energy density at which subsequent said first radio messages are transmitted from the third level to the first level, from the third level to the second level, or from the second level to the first level.

8. The system according to claim 4, wherein each of the set of mobile units (U1, U2, U3) is configured so that, a predetermined time period after having initiated transmission of the first radio message (M1) at the second or third level of energy density (PRF, P), the mobile unit transmits subsequent said first radio messages at the first level of energy density.

9. The system according to claim 1, wherein the energy density (PRF, P) represents at least one of:

a repetition frequency (PRF) at which a given said mobile unit transmits the first radio message (M1), and a power level (P) at which a given said mobile unit transmits the first radio message (M1).

10. The system according to claim 9, wherein:

the stationary reference (R2) defines an area (A2) in front of an automatically controlled gate, each one of the mobile units (U1, U2, U3) determined to have a location in said area (A2) is controlled to transmit subsequent said first radio messages at a higher repetition frequency (PRF) than other of the mobile units (U1, U2, U3) determined to be located outside said area (A2), and the central unit (CU) is configured to calculate a respective velocity of each of the mobile units (U1, U2, U3) determined to have a location in said area (A2) based on the first radio message (M1) transmitted at the higher repetition frequency (PRF).

11. The system according to claim 1, wherein each of the set of mobile units (U1, U2, U3) is configured to transmit the first radio message (M1) to each of the base stations (B1, B2, B3, B4, B5, B6, B7, B8) in the ultra-wide band.

12. The system according to claim 1, wherein at least one of the mobile units (U1, U2, U3) is configured to be attached to at least one of a livestock animal and an autonomous vehicle.

13. A computer-implemented positioning method performed in at least one processor and comprises:

transmitting, periodically, a first radio message (M1) from each mobile unit in a set of mobile units (U1, U2, U3), each of the mobile units being attached to a respective entity, the first radio message (M1) comprising identity information (ID[U1]) of the respective entity to which the mobile unit (U1) is attached;

receiving the first radio message (M1) in at least three base stations (B1, B2, B3); based thereon, forwarding, via at least one transmission line, the identity information (ID[U1]) and timing information (U1(t1), U1(t2); U1(t3)) indicative of a point in time when the first radio message (M1) was received in the respective base station; and receiving, in a central unit (CU) communicatively connected to the at least one transmission line, the identity information (ID[U1]) and the timing information (U1 (t1), U1(t2), U1(t3)) from the at least three base stations (B1, B2, B3); and based thereon determining a position of the respective entity relative to the at least three base stations, and altering, in each given one of the mobile units (U1, U2, U3), an energy density (PRF, P) at which subsequent said first radio messages are transmitted by the given mobile unit in response to a trigger input, the trigger input being generated depending on a location of the mobile unit (U1) relative to a stationary reference (R1, R2, R3), receiving, in each of the mobile units, a second radio message (M2) as the trigger input of a given said mobile unit when the location of the given mobile unit (U1) is within an area (A1) defined by the stationary reference (R1);

responsive to receiving the second radio message, causing the given mobile unit (U1) to alter the energy density (PRF, P) at which subsequent said first radio messages are transmitted, sending a first-area message (AM1) from the central unit (CU), which first-area message (AM1) is generated in response to a first said mobile unit (U1) having a location determined to be within a first said area (A1) defined by a first said stationary reference (R1), receiving the first-area message (AM1) in at least one of the base stations, and in response thereto transmitting the second radio message (M2) to the first mobile unit (U1).

14. The method according to claim 13, further comprising, in each given one of the mobile units:

detecting, in an inductive sensor (512) in the given mobile unit (U2), a magnetic field when the location of the given mobile unit (U2) is within an area (A2) defined by the stationary reference (R2), which magnetic field is created by at least one magnetic-field generator (G1, G2, G3); and in response to such a detection causing the given mobile unit (U2) to alter the energy density (PRF, P) at which subsequent said first radio messages are transmitted.

15. The method according to claim 13, further comprising:

transmitting, from each of the mobile units (U1, U2, U3), the first radio message (M1) at a first, a second or a third said level of energy density (PRF,P), the first level of energy density being a default level and the second and the third energy density levels being different from one another as well as from the first level;

transmitting, from the first mobile unit, the first radio message (M1) at the second level of energy density (PRF, P) in response to receiving the second radio message (M2), transmitting, from the central unit, a second-area message (AM2) via the at least one transmission line, which second-area message (AM2) is generated in response to a second said mobile unit (U2) having the location determined to be within area second said area (A3) defined by a second said stationary 0reference (R3), receiving the second-area message (AM2) in at least one of the base stations, in response thereto transmitting a third radio message (M3) to the second mobile unit (U3), and in response to receiving the third radio message (M3) in each of the mobile units in the set of mobile units (U1, U2, U3), transmitting subsequent said first radio messages from the second mobile unit at the third level of energy density (PRF, P).

16. The method according to claim 15, wherein the first level of energy density is lower than the second level of energy density, which, in turn, is lower than the third level of energy density.

17. The method according to claim 15, wherein the first radio message (M1) further comprises activity data (A[U1]) reflecting at least one activity parameter of the respective entity to which the mobile unit (U1) is attached, and the method further comprises:

receiving, in the central unit (CU) via at least one of the at least one transmission line, the activity data (A[U1]) from at least one of the base stations, which activity data (A[U1]) is comprised in the first radio message (M1) exclusively if the first radio message (M1) is transmitted at the first level of energy density (PRF, P); and based on the activity data (A[U1]), deriving the at least one activity parameter of the respective entity.

18. The method according to claim 15, wherein in response to receiving each of the second or third radio messages (M2; M3) in of the mobile (U1, U2, U3) units the method either comprises:

increasing the energy density at which subsequent said first radio messages are transmitted from the first level to the second level, from the first level to the third level, or from the second level to the third level; or decreasing the energy density at which subsequent said first radio messages are transmitted from the third level to the first level, from the third level to the second level, or from the second level to the first level.

19. The method according to any claim 15, comprising, for each of the mobile units:

a predetermined time period after having initiated transmission of the first radio message (M1) at the second or third level of energy density (PRF, P), transmitting subsequent said first radio messages at the first level of energy density (PRF, P).

20. The method according to claim 15, wherein the energy density (PRF, P) represents at least one of:

a repetition frequency (PRF) at which a given said mobile unit transmits the first radio message (M1), and a power level (P) at which a given said mobile unit transmits the first radio message (M1).

21. The method according to claim 20, wherein the stationary reference (R2) defines an area (A2) in front of an automatically controlled gate, and the method comprises controlling each mobile unit in the set of mobile units (U1, U2, U3) that is determined to have a location in said area to transmit subsequent said first radio messages (M1) at a higher repetition frequency (PRF) than other of the mobile units (U1, U2, U3) determined to be located outside said area (A2), and calculating, in the central unit (CU), a respective velocity of each of the mobile units (U1, U2, U3) determined to have a location in said area (A2) based on the first radio message (M1) transmitted at the higher repetition frequency (PRF).

22. The method according to claim 15, comprising:

transmitting the first radio message (M1) from each of the mobile units (U1, U2, U3) to each of the base stations (B1, B2, B3, B4, B5, B6, B7, B8) on the ultra-wide band.

23. A non-volatile data carrier (416, 516, 616) communicatively connected to a processing unit (415, 515, 615) and on which is stored a computer program, the computer program (417, 517, 617) comprising software for executing the method according claim 13 when the computer program (417, 517, 617) is run on the processing unit (415, 515, 615).

\*    \*    \*    \*    \*